June 1, 1954  J. W. BROCK  2,680,006
SHOCK ABSORBER FOR WEIGHT INDICATORS
Filed Aug. 28, 1950

John W. Brock
INVENTOR.

Patented June 1, 1954

2,680,006

UNITED STATES PATENT OFFICE 2,680,006

SHOCK ABSORBER FOR WEIGHT INDICATORS

John W. Brock, Big Spring, Tex.

Application August 28, 1950, Serial No. 181,868

1 Claim. (Cl. 255—33)

This invention comprises novel and useful improvements in a shock absorber for weight indicators and in general pertains to an improved shock absorber construction operable for guiding and cushioning cables against lateral vibration and particularly for protecting the weight indicators mounted upon the cables of oil well rigs from damage.

The principal object of this invention is to provide a shock absorber assembly for guiding and cushioning a cable against vibration when the same is under load.

A further object of the invention is to provide a shock absorber assembly which may be easily applied to or mounted upon the supporting leg of an oil well rig or derrick and which will cushion the well cable against lateral vibration or movement.

A further object of the invention is to provide an improved shock absorber as set forth in the preceding objects which is provided with antifriction means for guiding the cable during its reciprocating movement while adequately restraining the cable against lateral vibration and cushioning the cable during its reciprocation.

A still further object of the invention is to provide a shock absorber assembly as set forth in the preceding objects and provision is made for preventing damage which may be occasioned by inadvertent lowering of the cable.

These, together with various ancillary features and objects of the invention, which will later become apparent as the following description proceeds, are attained by the present invention, preferred embodiments of which have been illustrated, by way of example only, in the accompanying drawings, wherein.

Figure 1:
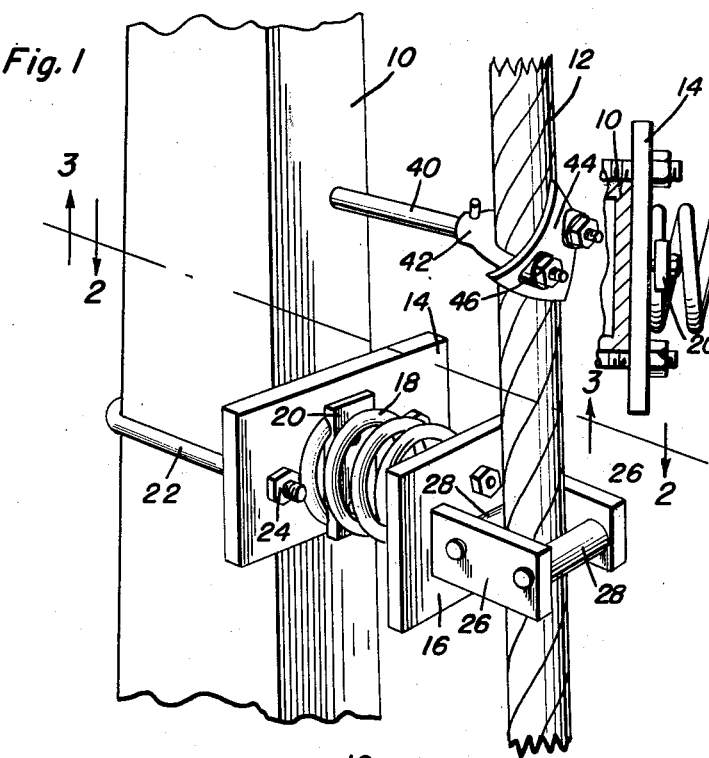
Figure 1 is a fragmentary perspective view showing a portion of the leg of an oil well rig and of a cable for an oil well together with the improved shock absorber assembly forming the subject matter of this invention.
Figure 2:
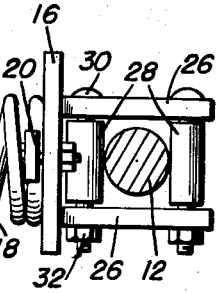
Figure 2 is a horizontal sectional view taken substantially on the plane indicated by the section line 2—2 of Figure 1.
Figure 3:
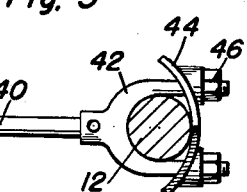
Figure 3 is a horizontal sectional view taken substantially upon the plane indicated by the section line 3—3 of Figure 1.

Referring now more specifically to the accompanying drawings, wherein like numerals designate similar parts throughout the various views, attention is directed first to the embodiment of the invention illustrated in Figures 1–3, wherein it will be seen that the numeral 10 designates a portion of the leg of an oil rig or oil derrick, while 12 indicates a portion of a well cable. The shock absorber forming the subject of this invention is intended as an attachment which may be detachably secured to the leg 10 and the cable 12 to guide the cable during its reciprocating movement; to cushion or restrain the cable against sudden lateral deflections during its use, and to provide a stop means for preventing sudden or excessive lowering of the cable which might result in damage to a weight indicator or the like attached thereto.

The shock absorber assembly therefore comprises an anchor plate 14 together with a shock absorber plate 16 disposed in spaced substantially parallel relation with respect thereto. These plates may be of any desired size and material as desired, and are preferably resiliently connected to each other as by a coil spring 18 whose end convolutions rest upon the adjacent surfaces of the plates 14 and 16, and are secured thereto as by clamping blocks or plates 20. Fastening means are provided for detachably securing the anchor plate 14 to or upon the leg 10 of the oil well rig. In the arrangement of Figure 1, this fastening means comprises a U-bolt 22 which is adapted to straddle or embrace the leg 10 and to have its threaded extremities extend through the anchor plate 14, being secured thereto as fastening nuts 24.

The shock absorber plate 16 is preferably provided with integrally or rigidly secured laterally extending parallel support arms 26 which are adapted to embrace the cable 12 on opposite sides of the same, and a pair of antifriction rollers 28 are journaled and supported between the arms 26. These rollers may be detachably secured and journaled between the support arms as by being mounted upon bolts 30 having nuts 32. In any event, it will be seen that the cable 12 is engaged by the pair of rollers 28 on opposite sides of the cable, and retained between the rollers by the support arms 26. During reciprocation of the cable in its use, it will be seen that the rollers will guide the cable and any tendency to lateral vibration will be resisted by the coil spring 18. Any sudden jars or side thrusts will be cushioned by the spring 18, this guiding and cushioning action thus greatly contributing to the life of the cable, the ease and safety of its operation, and minimizing any damage which might be occasioned to tools or articles which are carried by the cable.

Figure 4:
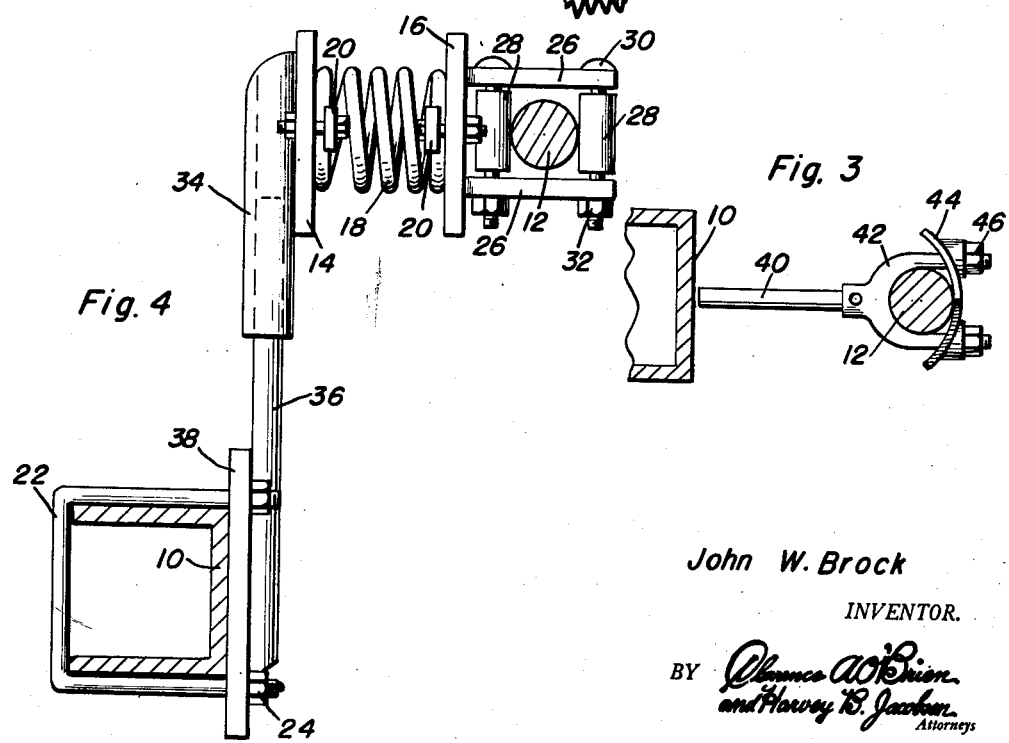
Figure 4 is a view similar to Figure 2 but showing an adjustable support for connecting the anchor plate of the shock absorber assembly to the leg of the oil well rig.

In some instances the cable 12 may not be disposed in sufficient proximity to the leg 10 to enable the mounting construction of Figure 1 to be employed. For those situations, the mounting means disclosed in Figure 4 may be employed wherein the anchor plate 14 is fixedly secured to the outer end of the outer member 34 of a telescoping and longitudinally adjustable support whose inner telescoping member may be in the form of a rod or pipe 36. This latter member is sufficiently secured to a plate or block 38 which is clamped against the above mentioned leg 10 as by a U-bolt 22 having fastening nuts 24.

In order to limit downward movement of the cable 12 and thus prevent damage to such instruments or implements as a weight indicator which may be attached to the cable, there is provided a safety stop in the form of a laterally extending rod 40 secured to a yoke 42 which embraces and encircles the cable 12, the yoke being retained upon the cable as by a clamping plate 44. The ends of the yoke are screw threaded and extend through suitable apertures in the clamping plate being retained therethrough as by locking nuts 46. It will thus be seen that by properly adjusting the stop upon the cable, the downward movement of the cable beyond a predetermined extent will be limited by the stop 40 which extends laterally from the cable resting upon either of the plates 14 or 16. If the stop should engage the plate 16 either by itself or in advance of the engagement of the stop with the plate 14, it will be evident that the spring 18 will serve to cushion this stopping action of downward movement of the cable.

It will of course be evident that the device hereinbefore disclosed may be used with horizontally extending cables as well as with the vertical arrangement illustrated. Thus, the device can be clamped upon any suitable horizontally extending member of the oil derrick instead of to the vertical member 10.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claim.

Having described the invention, what is claimed as new is:

A shock absorber for oil well cables comprising an anchor plate, means mounting said anchor plate on the leg of an oil well rig, a shock absorber plate parallel to and spaced from said anchor plate, means resiliently mounting said shock absorber plate on said anchor plate, guide means on said shock absorber plate guidingly receiving a cable, said mounting means comprising a fastener securing said anchor plate to said leg, an adjustable support connecting said anchor plate to said fastener.

References Cited in the file of this patent

UNITED STATES PATENTS

| Number | Name | Date |
|---|---|---|
| 914,579 | Jones | Mar. 9, 1909 |
| 1,258,952 | Short | Mar. 12, 1918 |
| 1,651,069 | Redick | Nov. 29, 1927 |
| 1,882,161 | Pierce | Oct. 11, 1932 |
| 2,170,057 | Kerr | Aug. 22, 1939 |
| 2,316,727 | Thompson | Apr. 13, 1943 |
| 2,478,486 | Holleron et al. | Aug. 9, 1949 |